United States Patent
Xin

(10) Patent No.: US 12,505,552 B2
(45) Date of Patent: Dec. 23, 2025

(54) DETERMINING TARGET OBJECT TYPE AND POSITION

(71) Applicant: KONINKLIJKE PHILIPS N.V., Eindhoven (NL)

(72) Inventor: Shichao Xin, Shenyang (CN)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 346 days.

(21) Appl. No.: 18/025,270

(22) PCT Filed: Sep. 1, 2021

(86) PCT No.: PCT/EP2021/074066
§ 371 (c)(1),
(2) Date: Mar. 8, 2023

(87) PCT Pub. No.: WO2022/053355
PCT Pub. Date: Mar. 17, 2022

(65) Prior Publication Data
US 2024/0029256 A1      Jan. 25, 2024

(30) Foreign Application Priority Data

Sep. 9, 2020   (WO) ............... PCT/CN2020/114160
Dec. 15, 2020   (EP) .................................... 20214021

(51) Int. Cl.
*G06T 7/00*      (2017.01)
*A61B 6/04*      (2006.01)
(Continued)

(52) U.S. Cl.
CPC .......... *G06T 7/0016* (2013.01); *A61B 6/0407* (2013.01); *G06T 7/11* (2017.01);
(Continued)

(58) Field of Classification Search
CPC ........ A61B 6/0407; G06T 2207/10116; G06T 2207/20076; G06T 2207/20081;
(Continued)

(56) References Cited

U.S. PATENT DOCUMENTS 5,402,462 A  *  3/1995  Nobuta ................ A61B 6/4476
                                                     378/205
5,610,811 A  *  3/1997  Honda .................... G09B 23/28
                                                     705/28

(Continued)

FOREIGN PATENT DOCUMENTS

WO     WO2019145951 A1     8/2019
WO     WO2020035661 A1     2/2020

OTHER PUBLICATIONS

PCT International Search Report, International application No. PCT/EP2021/074066, Dec. 8, 2021.

(Continued)

*Primary Examiner* — Zhiyu Lu
(74) *Attorney, Agent, or Firm* — Larry Liberchuk

(57) ABSTRACT

In an embodiment, a method (100) is described. The method is a computer-implemented method. The method comprises receiving (102) imaging data of a region comprising a radiographic imaging apparatus couch; and an indication of a specified number, type and position of at least one couch accessory associated with use of the radiographic imaging apparatus couch by a subject. The method further comprises determining (104) a type and position of at least one target object in the region using an instance segmentation model for processing the imaging data. Determining the type of the at least one target object comprises determining whether or not the at least one target object is a type of couch accessory specified by the indication. The method further comprises comparing (106) the determined position of the at least one target object that is determined to be the type of couch (Continued)

accessory specified by the indication with the indicated specified position for the couch accessory. The method further comprises, in response to determining that the determined position of the at least one target object does not correspond to the indicated specified position for the couch accessory, indicating (108) that the couch accessory is incorrectly positioned.

14 Claims, 4 Drawing Sheets

(51) Int. Cl.
    *G06T 7/11*     (2017.01)
    *G06T 7/174*     (2017.01)
    *G06T 7/215*     (2017.01)
    *G06T 7/73*     (2017.01)
    *G06V 10/764*     (2022.01)
    *G06V 10/774*     (2022.01)
    *G06V 10/82*     (2022.01)
    *G16H 30/40*     (2018.01)

(52) U.S. Cl.
    CPC .............. *G06T 7/174* (2017.01); *G06T 7/215* (2017.01); *G06T 7/74* (2017.01); *G06V 10/764* (2022.01); *G06V 10/774* (2022.01); *G06V 10/82* (2022.01); *G16H 30/40* (2018.01); *G06T 2207/10116* (2013.01); *G06T 2207/20076* (2013.01); *G06T 2207/20081* (2013.01); *G06T 2207/20084* (2013.01); *G06T 2207/30016* (2013.01)

(58) Field of Classification Search
    CPC . G06T 2207/20084; G06T 2207/30016; G06T 7/0016; G06T 7/11; G06T 7/174; G06T 7/215; G06T 7/74; G06V 10/40; G06V 10/764; G06V 10/774; G06V 10/82; G06V 20/00; G06V 20/64; G16H 30/40
    See application file for complete search history.

(56) References Cited

U.S. PATENT DOCUMENTS

| | | | |
|---|---|---|---|
| 10,453,197 B1* | 10/2019 | Cholakkal | G06V 10/454 |
| 10,543,197 B2 | 1/2020 | Cai et al. | |
| 11,593,931 B2* | 2/2023 | Simson | G06V 30/1437 |
| 11,923,068 B2 | 3/2024 | Nawana | |
| 11,972,857 B2 | 4/2024 | Krueger | |
| 11,978,551 B2 | 5/2024 | Krueger | |
| 12,285,298 B2* | 4/2025 | Kumar | A61B 90/08 |
| 2013/0113929 A1* | 5/2013 | DeLand | A61B 90/90 |
| | | | 382/103 |
| 2015/0003704 A1* | 1/2015 | Nomura | G06V 20/66 |
| | | | 382/128 |
| 2016/0067525 A1* | 3/2016 | Bouchet | A61N 5/1069 |
| | | | 600/1 |
| 2016/0367169 A1* | 12/2016 | Hardie | A61B 5/743 |
| 2016/0379504 A1* | 12/2016 | Bailey | G06V 40/10 |
| 2018/0204323 A1* | 7/2018 | Sayani | G06Q 10/087 |
| 2018/0338801 A1* | 11/2018 | Barnett | H04N 7/183 |
| 2019/0320995 A1* | 10/2019 | Amiri | G16H 50/30 |
| 2019/0378287 A1 | 12/2019 | Hollander | |
| 2020/0193241 A1* | 6/2020 | Katayama | A61B 34/20 |

OTHER PUBLICATIONS

Yao R. R. et al., "Video Object Segmentation and Tracking: A Survey", ACM Transactions on Intelligent Systems and Technology, Associ Ation for Computing Machinery Corporation, 2 Penn Plaza, Suite 701 New York NY 10121-0701 USA, vol. 11, No. 4, May 23, 2020, pp. 1-47, XP058492172.

Xiong H. et al., "Research on Abnormal Object Detection in Specific Region Based on Mask R-CNN", International Journal of Advanced Robotic Systems, vol. 17, No. 3, May 31, 2020 (May 31, 2020), XP055807771.

Eung-Joo L. et al., "Weakly Supervised Segmentation for Real-Time Surgical Tool Tracking", Healthcare Technology Letters 2019, vol. 6, No. 6, Dec. 31, 2019 (Dec. 31, 2019), pp. 231-236, XP006088055.

Zhang Y. et al., "Mask-Refined R-CNN: A Network for Refining Object Details in Instance Segmentation", Sensors, vol. 20, issue 4, 2020.

Krause M. et al., "Multi-Object Tracking and Segmentation Using Instance Embeddings", Visual Computing Institute, May 2019.

* cited by examiner

DETERMINING TARGET OBJECT TYPE AND POSITION

TECHNICAL FIELD OF THE INVENTION

The invention relates to a method, machine-readable medium and apparatus for determining target object type and position.

BACKGROUND OF THE INVENTION

Various accessories may be used in conjunction with a patient support, sometimes referred to as a 'couch', for a radiographic imaging apparatus such as a computed tomography (CT) scanner. These accessories may include: a headrest, foot extension, knee support, interventional control box, etc. Different types of radiographic imaging apparatus and radiographic imaging protocols may use corresponding accessories. For example, different types of brain scans need to use different headrests that are suited to the clinical scenario. Similarly, the provision of a knee support can ensure that the lumber spine is at a correct angle during imaging. In general, the adequate use of couch accessories may assist with patient imaging. For example, the adequate use of couch accessories may contribute to a good image quality and/or lead to a reduced radiation (e.g., X-Ray) dose. Further, appropriate use of couch accessories may improve the consistency of different radiologists' operations.

SUMMARY OF THE INVENTION

Aspects or embodiments described herein relate to improving the outcome of patient imaging. Aspects or embodiments described herein may obviate one or more problems associated with inappropriate or inconsistent use of accessories used in conjunction with a couch for a radiographic imaging apparatus.

In a first aspect, a method is described. The method is a computer-implemented method. The method comprises receiving imaging data of a region comprising a radiographic imaging apparatus couch. The method further comprises receiving an indication of a specified number, type and position of at least one couch accessory associated with use of the radiographic imaging apparatus couch by a subject. The method further comprises determining a type and position of at least one target object in the region using an instance segmentation model for processing the imaging data. Determining the type of the at least one target object comprises determining whether or not the at least one target object is a type of couch accessory specified by the indication. The method further comprises comparing the determined position of the at least one target object that is determined to be the type of couch accessory specified by the indication with the indicated specified position for the couch accessory. In response to determining that the determined position of the at least one target object does not correspond to the indicated specified position for the couch accessory, the method further comprises indicating that the couch accessory is incorrectly positioned.

In some embodiments, the specified position of the at least one couch accessory is based on the subject's need for the at least one couch accessory to be positioned appropriately to support the subject.

In some embodiments, the received imaging data includes depth information of the region. For example such imaging data can be provided by a range sensor, examples of which can be a stereo or 3D camera or radiofrequency radars.

In some embodiments, determining in includes determining that there is a plurality of target objects in the region, in response to which the method comprises determining the type of couch accessory corresponding to each of the target objects from said plurality. In response to determining that there is a plurality of target objects of the same type, the method further comprises selecting one target object from the plurality of target objects of the same type that has the highest prediction probability according to the instance segmentation model.

In some embodiments, the method further comprises determining a distance between adjacent target objects of different types. In response to determining that the distance is below a threshold, the method further comprises selecting one target object from the adjacent target objects that has the highest prediction probability of the different types according to the instance segmentation model.

In some embodiments, the method further comprises comparing consecutive frames from the imaging data to determine whether the position of the target object has changed in the region between the consecutive frames and/or whether the number and/or type of target object has changed in the region between the consecutive frames.

In some embodiments, in response to determining that the target object exists in both of the consecutive frames, the method comprises comparing a prediction probability of the target object in the latest of the consecutive frames with a prediction threshold. In response to determining that the prediction probability is above the prediction threshold, the method comprises providing an indication that the target object exists in the latest frame, or in response to determining that the prediction probability is not above the prediction threshold, the method comprises determining the distance between the target object in the consecutive frames. In response to determining that the distance between the target object in the consecutive frames is below a distance threshold, the method comprises providing an indication that the target object exists in the latest frame, or in response to determining that the distance between the target object in the consecutive frames is not below the distance threshold, the method comprises providing an indication that the target object does not exist in the latest frame.

In some embodiments, in response to determining that the target object exists in the latest of the consecutive frames but not in the earliest of the consecutive frames, the method comprises comparing a prediction probability of the target object in the latest frame with a prediction threshold. In response to determining that the prediction probability is above the prediction threshold, the method comprises providing an indication that the target object exists in the latest frame, or in response to determining that the prediction probability is not above the prediction threshold, the method comprises providing an indication that the target object does not exist in the latest frame.

In some embodiments, in response to determining that the target object exists in the earliest of the consecutive frames but not in the latest of the consecutive frames, the method comprises determining whether the target object is located at a boundary in the latest frame. In response to determining that at least part of the target object is located at the boundary, the method comprises providing an indication that the target object does not exist in the latest frame, or in response to determining that the target object is not located at the boundary, the method comprises providing an indication that the target object exists in the latest frame. In some embodiments, the method comprises determining the type of each target object in the region and tracking each target object in consecutive frames of the imaging data.

In some embodiments, the method comprises causing a display to indicate a detected type and/or position of each target object with respect to a representation of the radiographic imaging apparatus couch.

In some embodiments, the method comprises causing the display to indicate that the couch accessory is incorrectly positioned if the determined position of the at least one target object does not correspond to the indicated specified position for the couch accessory.

In some embodiments, the instance segmentation model is implemented by a Mask Region-based Convolutional Neural Network, R-CNN, trained using a dataset prepared using a plurality of images of different radiographic imaging apparatus couch settings annotated according to at least one predefined annotation principle.

In some embodiments, the different radiographic imaging apparatus couch settings comprise at least one of: at least one different combination of position, number and/or type of couch accessory in at least one of the plurality of images; at least one different background in at least one of the plurality of images; at least one partially occluded couch accessory in at least one of the plurality of images; and/or presence of a subject using the radiographic imaging apparatus couch in at least one of the plurality of images.

In some embodiments, the at least one predefined annotation principle comprises at least one of: a predefined minimum accuracy for couch accessory annotation; not annotating a couch accessory that is completely occluded; not annotating a part of a couch accessory that is subject to at least a specified level of shadowing in the image; and/or ignoring a couch accessory with less than a predefined exposure level in the image.

In a second aspect, a tangible machine-readable medium is described. The tangible machine-readable medium comprises instructions which, when executed on at least one processor, cause the at least one processor to implement the method of the first aspect or related embodiments.

In a third aspect, apparatus is described. The apparatus comprises processing circuitry. The processing circuitry implements the method of the first aspect or related embodiments. The processing circuitry comprises a receiving module configured to receive imaging data of a region comprising a radiographic imaging apparatus couch. The receiving module is further configured to receive an indication of a specified number, type and position of at least one couch accessory associated with use of the radiographic imaging apparatus couch by a subject. The processing circuitry further comprises a determining module configured to determine a type and position of at least one target object in the region using an instance segmentation model for processing the imaging data, wherein determining the type of the at least one target object comprises determining whether or not the at least one target object is a type of couch accessory specified by the indication. The processing circuitry further comprises a comparing module configured to compare the determined position of the at least one target object that is determined to be the type of couch accessory specified by the indication with the indicated specified position for the couch accessory. The processing circuitry further comprises an indicating module configured to, in response to determining that the determined position of the at least one target object does not correspond to the indicated specified position for the couch accessory, indicate that the couch accessory is incorrectly positioned. These and other aspects of the invention will be apparent from and elucidated with reference to the embodiment(s) described hereinafter.

BRIEF DESCRIPTION OF DRAWINGS

Exemplary embodiments of the invention will now be described, by way of example only, with reference to the following drawings, in which.

DETAILED DESCRIPTION OF THE EMBODIMENTS

Figure 1:
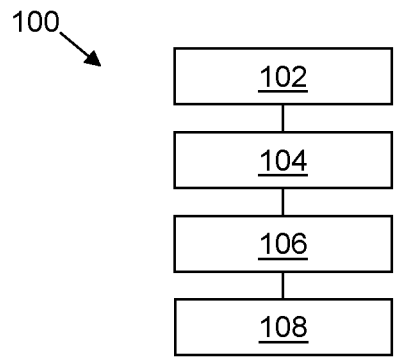
FIG. 1 refers to a method of improving the outcome of patient imaging according to an embodiment.

FIG. 1 shows a method 100 (e.g., a computer-implemented method) which may be used to improve the outcome of using a radiographic imaging apparatus to perform patient (radiographic) imaging. The method 100 may be implemented by a computer such as a user computing device, or a server or cloud-based service (e.g., communicatively coupled to the user device). The method 100 may be used to provide certain information which can be used by an operative such as a clinician or radiologist to determine whether or not the accessories used in conjunction with a couch for a radiographic imaging apparatus are being used appropriately when performing radiographic imaging.

The method 100 comprises, at block 102, receiving imaging data of a region (e.g., 'region of interest') comprising a radiographic imaging apparatus couch. At block 102, the method 100 further comprises receiving an indication of a specified number, type and position of at least one couch accessory associated with use of the radiographic imaging apparatus couch by a subject. The received imaging data may be acquired by an imaging device such as a camera positioned to acquire images (e.g., color images) of the region comprising the couch, which may include the patient, operatives such as a radiologist or other clinical staff and/or accessories to be used in conjunction with the couch. Alternatively, the received imaging data may be acquired by a range sensor, wherein the imaging data include depth information of the region. The camera or range sensor may be positioned in a room comprising the radiographic imaging apparatus and may, in some cases, be used by operatives to (visually) monitor the patient during a radiographic imaging procedure. It is therefore possible that different radiographic imaging apparatus couch settings (i.e., different rooms that have different couches, radiographic imaging apparatus and/ or equipment layouts) have a camera or a range sensor at different positions in the setting (e.g., a camera located in the ceiling), so that the view of the couch and/or patient is different for each setting. For example, a camera may be configured to acquire images corresponding to a side view, top view (which may be acquired for a camera located in the ceiling) or perspective view of the couch and/or patient. This may mean that there are lots of different possible views to be analyzed, which may be a complex task due to the different possible views and/or different features and layout of the setting.

The received indication of the specified number, type and position of the at least one couch accessory may be input manually or automatically. For example, an operator may input details of the number, type and position of the at least one couch accessory that they expect to be needed for the subject (e.g., a patient). Such details could be input on a user interface, user computer, or the like. Otherwise, the details may be determined automatically e.g., computer-generated based on certain information such as patient details (e.g., height, weight, medical conditions, etc.). The received indication may indicate where to position at least one type of couch accessory relative to the subject (i.e., under, on or around the subject) e.g., in a manner that is personalized to the subject.

The method 100 further comprises, at block 104, determining a type and position of a (e.g., at least one) target object in the region using an instance segmentation model for processing the imaging data. Determining the type of the target object, at block 104, comprises determining whether or not the target object is a type of couch accessory specified by the indication.

Thus, the type of target object may refer to the predetermined type of accessory associated with the radiographic imaging apparatus couch. Examples of such predetermined types of accessories include: a headrest, foot extension, knee support, interventional control box, etc. The instance segmentation model may distinguish between the different predetermined types of accessories and determine the position of at least one target object in the region. By being trained as described below, the instance segmentation model may be capable of distinguishing between and recognizing different types of couch accessories.

The method 100 further comprises comparing, at block 106, the determined position of the at least one target object that is determined to be the type of couch accessory specified by the indication with the indicated specified position for the couch accessory.

In response to determining that the determined position of the at least one target object does not correspond to the indicated specified position for the couch accessory, the method 100 further comprises indicating, at block 108, that the couch accessory is incorrectly positioned. The indication may comprise, for example, a warning message to allow staff to correct the number, type and/or position of the couch accessories.

Thus, in some cases, the method 100 may allow a determination to be made that a target object in the region is one of, for example, a headrest, foot extension, knee support, interventional control box, etc. The method 100 may further determine the position of the target object, for example, within the region or with respect to the couch and/or patient. If the at least one target object is determined to be not in the specified position, the method 100 may provide an indication to alert an operator so that the position of the at least one target object may be corrected. While acquiring the imaging data, which may be a live camera feed, the method 100 may track at least one target object in the region and identify the type of target object (i.e., the predetermined type of accessory).

The method 100 implements the instance segmentation of couch accessories based on the received imaging data (e.g., acquired by a camera, range sensor, etc.). As mentioned previously, the type and position of the target object (or couch accessory) can be determined by implementing the instance segmentation model. In some cases, the instance segmentation model may be used to determine a (3D) contour (e.g., perimeter or other outer profile corresponding to the shape) of the target object. In some embodiments, once a new accessory is detected within the field of view of the camera or the range sensor, the accessory may be tracked (and its 'type' identified) until it leaves the camera's field of view. In the tracking process, even if the accessories are partially or even completely occluded, the instance segmentation model may still be capable of determining that a certain accessory type is at a certain position due to the tracking capability.

In some embodiments, the specified position of the at least one couch accessory is based on the subject's need for the at least one couch accessory to be positioned appropriately to support the subject. Thus, the specified position may be personalized to the subject.

In some embodiments, the method 100 may be capable of determining the type and position of couch accessories that are positioned initially on the couch before the patient lies down on the couch. In some embodiments, the method 100 may be capable of determining the type and position of couch accessories where the patient initially lies down on the couch and then the accessories are positioned on, around or under the patient. If the accessories are misused or forgotten, the method 100 may facilitate the provision of an indication (e.g., a warning message) to allow staff to correct the number, type and/or position of the couch accessories.

Thus, implementation of certain methods described herein may help an operative to ensure that the accessories used are in accordance with a specified radiographic imaging protocol. Accordingly, the method 100 may lead to a reduction in mistakes due to incorrect couch accessory use, which may reduce operative workload, reduce the radiographic imaging time and/or improve the quality of the radiographic images.

In some embodiments, the instance segmentation model is implemented by a Mask Region-based Convolutional Neural Network (R-CNN). The Mask R-CNN may be trained using a dataset prepared using a plurality of images (e.g., camera images) of different radiographic imaging apparatus couch settings annotated according to at least one predefined annotation principle, described in more detail below. The instance segmentation model may be capable of target object recognition and tracking even where there are different possible views and/or different features and layout of the setting in the images.

Mask R-CNN is an example of an instance segmentation algorithm in deep learning, which is capable of identifying different object types. In combination with the instance segmentation model, an object tracking algorithm is implemented by certain embodiments described herein for tracking the couch accessories.

The training of the instance segmentation model is now described according to an embodiment. As explained previously, different radiographic imaging apparatus couch settings (i.e., rooms) have different setups. A dataset was prepared to account for the different possible radiographic imaging apparatus couch settings that might be used worldwide by different operatives to such an extent that the instance segmentation model is capable of determining the type of couch accessories.

To prepare the dataset, four different types of couch accessories were used. The first type of couch accessory is a headrest (of which there are three different sub-types of headrests) for supporting a patient's head on the couch. The second type of couch accessory is a foot extension (one sub-type) for supporting the patient's feet. The third type of couch accessory is a knee support (one sub-type) for supporting the patient's legs and/or knees. The fourth type of couch accessory is an interventional control box (one sub-type) for controlling interventional equipment used on the patient e.g., during a radiographic imaging procedure. Each of these couch accessories has a unique shape, which means that the instance segmentation model can distinguish between these different couch accessories.

In some embodiments, the different radiographic imaging apparatus couch settings used to provide the dataset include camera imaging data (i.e., the 'plurality of images') where at least one of the following (first to fourth) couch configurations was imaged by the camera.

For a first couch configuration, at least one image of the plurality of images in the dataset has at least one different combination of position, number and/or type of couch accessory. For example, the couch accessories may be positioned at different locations and imaged by the camera. In another example, not all of the different types of couch accessory are present in an image. In another example, every type of couch accessory is present in an image.

For a second couch configuration, at least one different background may be used in at least one of the plurality of images. For example, different objects (i.e., non-target objects) may be present in the field of view and/or due to the camera being at a different position, different objects may be visible in the field of view.

For a third couch configuration, at least one partially occluded couch accessory may be present in at least one of the plurality of images. For example, the couch accessory may be at least partially occluded if the couch accessory is being introduced to or removed from the setting, being handled by an operative, at least partially occluded by a patient and/or at least partially occluded by equipment such as another couch accessory.

For a fourth couch configuration, the presence of a subject (e.g., a patient) using the radiographic imaging apparatus couch may be present in at least one of the plurality of images. For example, the subject may be sat or lying on the couch and at least one couch accessory may be positioned on, around or under the subject.

An annotation tool that implements the at least one predefined annotation principle (or at least allows a human trainer to facilitate the implementation of the at least one predefined annotation principle) may be implemented by a computer user interface (not shown) for displaying the camera images and allowing the human trainer to input (e.g., 'annotate') for each of those images the type of couch accessory. For example, the instance segmentation algorithm may identify certain objects in the image and the human trainer may select the type of couch accessory from the predetermined types of couch accessories (e.g., from a previously input list of couch accessories that are present in the plurality of images) in order to train the model.

In some embodiments, the at least one predefined annotation principle comprises at least one of the following (first to fourth) predefined annotation principles.

A first predefined annotation principle may refer to a predefined minimum accuracy for couch accessory annotation. For example, by using a human trainer, annotation of the couch accessory (i.e., selection of the 'type' of couch accessory) may be regarded as highly accurate. In other similar words, the trainer may be regarded as annotating as accurately as possible.

A second predefined annotation principle may refer to not annotating a couch accessory that is completely occluded. For example, occluded couch accessories may cause errors in training the instance segmentation model. However, a partially occluded couch accessory may still be annotated. For example, the unclosed/exposed parts (i.e., non-occluded) of the couch accessories may be annotated A third predefined annotation principle may refer to not annotating a part (or the whole) of a couch accessory that is subject to at least a specified level of shadowing in the image. For example, shadowing may cause errors in training the instance segmentation model. In some examples, tor the same couch accessory, in a part of the image where the shadow is not considered heavy (e.g., below a threshold), the accessory may be annotated in the part. However, where the shadow is too heavy (e.g., above the threshold) in a part of the image, the accessory may not be annotated in that part. Thus, even if part of the accessory is subject to heavy shadowing, it is not necessary for the whole accessory to remain unmarked by the trainer (i.e., not annotated).

A fourth predefined annotation principle may refer to ignoring a couch accessory with less than a predefined exposure level in the image. For example, an exposure level of less than 10% (e.g., due to insufficient light in the setting) may be regarded as causing unacceptable errors when used to train the instance segmentation model.

Thus, by using the different couch configurations described above in combination with the at least one predefined annotation principle, the images may be sufficiently varied to enable the instance segmentation model to be well trained in different possible settings, which may allow the instance segmentation model to accurately determine the type of couch accessory in the imaging data and thereby facilitate the object tracking procedure.

The dataset used to train the instance segmentation model involved 1455 images for training and 200 images for validation purposes. Further, augmentation was applied to the images used to assist in training the instance segmentation model, in order to account for potential errors and/or variations in the image quality that are expected to be obtained in the field (e.g., due to non-optimal lighting and camera set-ups). In other similar words, it may be anticipated that the various cameras, lighting arrangements and settings used by the end user to monitor a radiographic imaging procedure may lead to some variability in terms of the image quality. By using augmentation methods to account for this potential variability, the instance segmentation model may be still be capable of determining the type of couch accessory in an image even where the image quality is non-optimal or not at expected).

Examples of augmentation methods used to produce the dataset include the following augmentation methods. In some embodiments, a selection of these augmentation methods may be used to produce a dataset that trains the instance segmentation model to identify the couch accessory type with a minimum prediction accuracy (e.g., above 99%).

The augmentation methods include: applying affine transformations to images; adding noise sampled from Gaussian distributions elementwise (i.e., pixelwise) to images; multiplying all pixels in an image with a specific value, thereby making the image darker or brighter; degrading the quality of images by JPEG-compressing them; set rectangular areas (i.e., pixel values within those rectangular areas) within images to zero; alpha-blending two image sources using an alpha/opacity value; blurring an image by computing simple means (e.g., applying a blurring filter) over neighborhoods in the image; adjusting the image contrast; flipping or mirroring input images horizontally; flipping or mirroring input images vertically; converting non-snowy landscapes to snowy ones; and adding clouds to images.

This level of training (i.e., the variance between the different images according to the different couch configurations and/or the augmentation methods, as well as the number of images used for the dataset) was found to produce reliable and consistent identification of couch accessory type as well as facilitating adequate couch accessory tracking.

Figure 2:
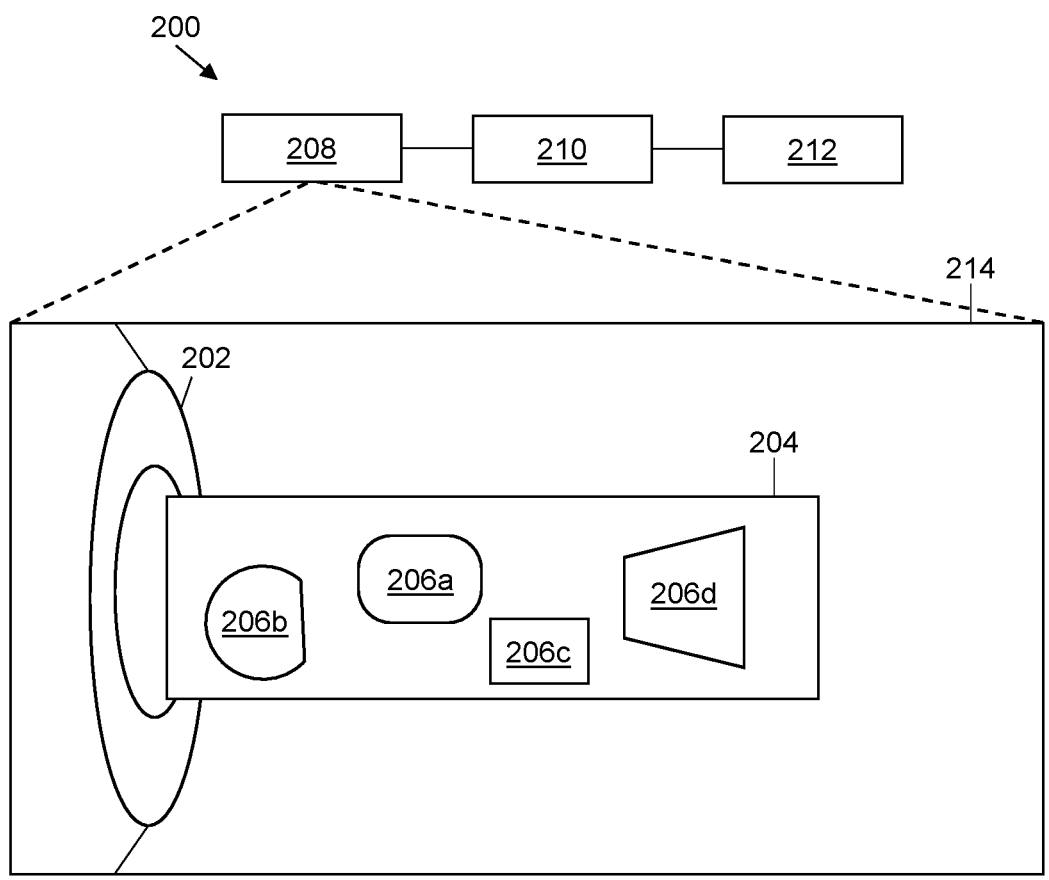
FIG. 2 is a schematic drawing of a system for improving the outcome of patient imaging according to an embodiment.

FIG. 2 shows a system 200 for implementing certain methods described herein. Images acquired using the system 200 may be used to train and/or validate the model described above. However, the system 200 may be used by an end user (e.g., an operative) to improve the outcome of patient imaging using a radiographic imaging apparatus 202. Although an end user may train the model (e.g., using their own couch accessories), the actual system 200 used by an end user may be different to the system 200 used to train and/or validate the model. For example, a manufacturer or installer of a radiographic imaging apparatus 202 may train the model by using images from multiple different settings (e.g., which use different system 200 set-ups) while an end user may use the system 200 as depicted by FIG. 2.

The radiographic imaging apparatus 202 further comprises a couch 204 for supporting a plurality (four in this case but could be any number) of couch accessories 206a-206d. These couch accessories 206a-206d have different shapes in FIG. 2 and can be recognized using the instance segmentation model. In use of the radiographic imaging apparatus 202, a patient (not shown) may lie on the couch 204 and the couch accessories 206a-206d needed for the patient may be positioned appropriately to support the patient. Since the couch accessories 206a-206d may be positioned under the patient, the couch accessories 206a-206d may be at least partially occluded. However, the instance segmentation model trained as described above has been found to identify and track the couch accessories 206a-206d with adequate accuracy.

In this embodiment, the system 200 comprises a camera 208 (i.e., an 'imaging device') for acquiring imaging data, a computing device 210 (e.g., comprising a processing apparatus and optionally a memory) and a display 212 for displaying the imaging data. In this embodiment, the computing device 210 is configured to receive imaging data from the camera 208, which is configured to capture images of the region 214 shown in FIG. 2.

Alternatively, the system 200 can comprise a range sensor as an embodiment of an imaging device, wherein the range sensor is arranged to provide depth information of the region 214. In other similar words, the region 214 can be an (3D) image (captured by the camera 208) of the radiographic imaging apparatus 202, couch 204, couch accessories 206a-206d and/or any other objects or subjects in the region 214. The computing device 210 is communicatively coupled to the display 212 in order to cause the display 212 to display the imaging data which, where relevant, may include information indicating the position of any identified couch accessories 206a-206d and/or any further information such as a warning message regarding missing and/or incorrectly positioned couch accessories 206a-206d.

In some embodiments, the computing device 210 may be implemented by a user computer. In some embodiments, the computing device 210 may be implemented by a server or cloud-based computing service. The processing apparatus of the computing device 210 may implement certain methods described herein (e.g., implement the method 100, cause the camera 208 to acquire the imaging data and/or cause the display 212 to display the imaging data, including information regarding which couch accessories 206a-206d are needed and/or if any couch accessories 206a-206d are missing or in the wrong position). Where present, the memory of the computing device 210 (or another memory not forming part of the computing device 210) may store the instance segmentation model itself, any instructions for implementing the instance segmentation model and/or instructions for implementing couch accessory tracking.

In some embodiments where the instance segmentation model is being trained, the computing device 210 may access a memory (e.g., of the computing device 210 or another memory not provided by the computing device 210) comprising the training dataset and carry out a training procedure (e.g., receive input from a human trainer via a user interface (e.g., provided by the display 212).

Figure 3A:
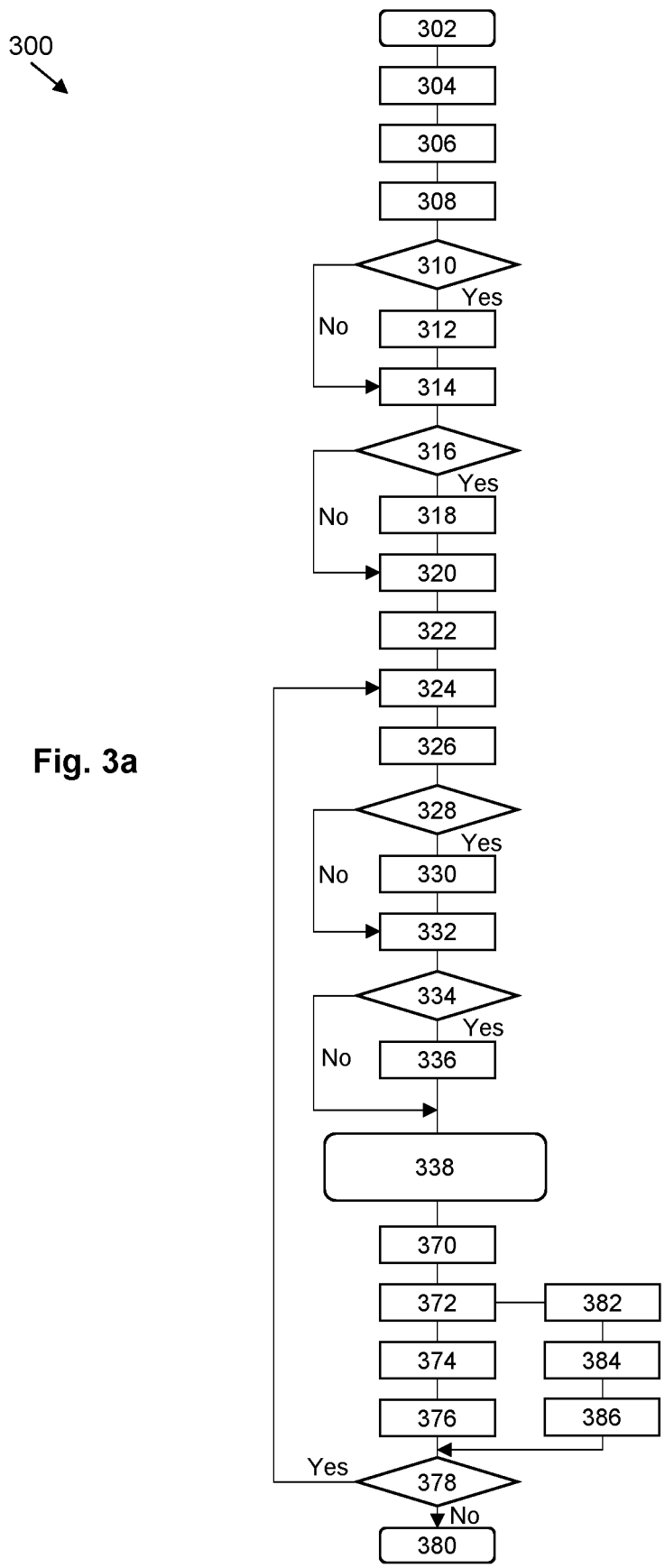
FIGS. 3a-3b refer to a method of improving the outcome of patient imaging according to an embodiment.
Figure 3B:
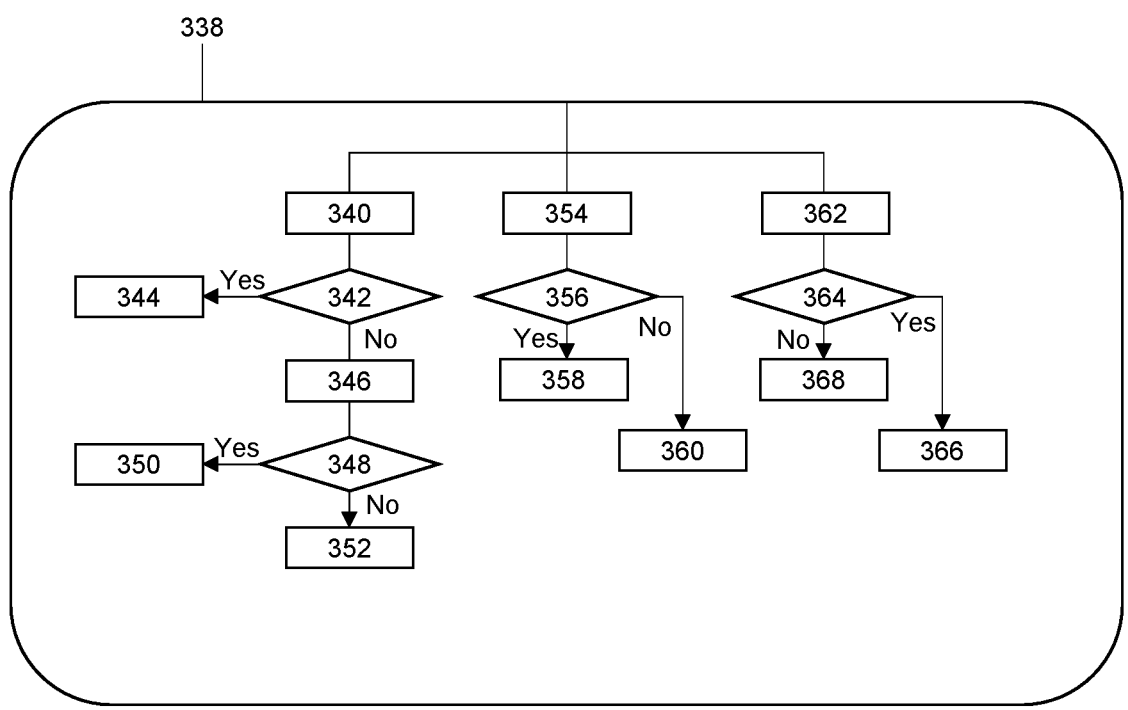

FIGS. 3a-3b show a method 300 (e.g., a computer-implemented method) which may be used to improve the outcome of using a radiographic imaging apparatus to perform patient imaging. The method 300 may be implemented by a computer (e.g., computing device 210) such as a user computing device, or a server or cloud-based service (e.g., communicatively coupled to the user device). The method 300 comprises certain blocks for implementing the method 100. Certain blocks may be omitted and/or may be performed in a different order to that shown by FIG. 3. For example, part of the method 300 may be implemented when training the instance segmentation model but this part of the method 300 may not be implemented by an end user and therefore can be omitted when implemented by the end user. Where appropriate, reference is made to the method 100 and system 200 above.

The method 300 is initialized at block 302.

At block 304 of the method 300, the instance segmentation model is built (i.e., trained and verified as described above).

At block 306 of the method 300, a first frame (i.e., a first image of the imaging data, said image data may including 3D information) is obtained (e.g., by causing the camera 208 to obtain the first frame, which is received by the computing device 210 either directly from the camera 208 or from a memory for storing the imaging data).

At block 308 of the method 300, the instance segmentation model is used to determine the types of couch accessories 206a-206d in the first frame and the position of those couch accessories 206a-206d. Determining the position of the couch accessory may comprise determining where, in the frame, the couch accessory is located and/or determining the segment of the contour (e.g., profile or perimeter) of the couch accessory.

The selection of which couch accessories 206a-206d (hereinafter referred to as 'target objects' since there may be any number and type of couch accessories in a particular field of view) to track and the tracking of target objects is now described.

In some embodiments, in response to determining that there are a plurality of target objects in the region 214, the method 300 comprises determining the type of couch accessory corresponding to each of the target objects, and in response to determining, at block 310, that there are a plurality of target objects of the same type (i.e., 'yes' in FIG. 3a), the method 300 further comprises selecting, at block 312, one target object from the plurality of target objects of the same type that has the highest prediction probability according to the instance segmentation model. In other similar words, if the number of target objects of the same type is more than 1 (one), the method 300 may select the target object with the highest prediction probability (and discard any remaining target objects with the lower prediction probability). Thus, the method 300 permits tracking one type of target object at a time (i.e., one target object of the same type).

In some embodiments, the instance segmentation model may assign a prediction probability to each target object detected based on how confident the model is that the target object is indeed one of the predetermined types of target objects.

In some embodiments, the method 300 comprises determining, at block 314, a distance between adjacent target objects of different types. It might be beneficial to have a depth image data of the region 214, which could enable the computing device 210 outputting a more precise distance measure between the adjacent target objects. In response to determining, at block 316, that the distance is below a threshold (i.e., 'yes' in FIG. 3*a*), the method 300 further comprises selecting, at block 318, one target object from the adjacent target objects that has the highest prediction probability of the different types according to the instance segmentation model. In other similar words, if the distance between adjacent target objects is below the threshold, the method 300 selects the type of couch accessory with the highest prediction probability (e.g., to reduce the couch accessory identification and/or tracking error rate). The method 300 then proceeds to block 320.

Where the distance is equal to or above the threshold at block 316 (i.e., 'no' in FIG. 3*a*), the method 300 proceeds to block 320.

In some embodiments, the threshold is a number of pixels (which translates to the physical distance between the edge of two adjacent target objects), for example, 50 pixels or another number, which may depend on the resolution of the camera 208. Applicable to all 2D and 3D imaging data examples, the threshold may be selected according to an accuracy of the instance segmentation model's capability for distinguishing between target objects which are in close physical proximity. For example, the threshold may be dynamically adjusted according to the prediction probability of the target object.

At block 320 of the method 300, the target objects that have been identified and retained in the first frame are retained (e.g., for target object tracking purposes) if they have a prediction probability above a certain threshold (e.g., more than 99.9% or another appropriate value).

At block 322 of the method 300, a prediction result is obtained for the first frame. That is, a prediction of the position and identification (i.e., type) of the target objects in the first frame. This information may be used to update a memory accessible to the computing device 210. For example, the memory may hold a previous prediction result (e.g., labeled 'last r') and block 322 causes this previous prediction result to be updated with the prediction result obtained for the first frame.

At block 324 of the method 300, a second frame (i.e., a second image of the imaging data) is obtained (e.g., by causing the camera or the range sensor 208 to obtain the second frame, which is sent to the computing device 210). The functionality of block 324 corresponds to the functionality provided by block 306. The same functionality of the blocks 306 to 318 used for obtaining the prediction result (at block 322) for the first frame is used to obtain a prediction result for the second frame. In other similar words, the functionality of blocks 306, 308, 310, 312, 314, 316 and 318 (as applied to the first frame) corresponds to the functionality of blocks 324, 326, 328, 330, 332, 334 and 336 (as applied to the second frame), respectively.

At block 338, a prediction result is obtained for the second frame, as described below. Thus, in some embodiments, the method 300 comprises comparing, at block 338, consecutive frames from the imaging data (i.e., the first and second frames) to determine whether the position of the target object has changed in the region between the consecutive frames and/or whether the number and/or type of target object has changed in the region between the consecutive frames.

Block 338 is shown in more detail in FIG. 3*b* and described below.

In some embodiments, in response to determining, at block 340, that the target object exists in both of the consecutive frames, the method 300 comprises comparing, at block 342, a prediction probability of the target object in the latest (i.e., the second frame) of the consecutive frames with a prediction threshold (e.g., 99.9% as determined according to the instance segmentation model).

In response to determining that the prediction probability is above the prediction threshold (i.e., 'yes'), the method 300 comprises providing, at block 344, an indication that the target object exists in the latest frame. In some embodiments, providing the indication comprises saving information relating to the detected target object for use in the prediction result for the second frame (e.g., labeled 'this_r')

However, in response to determining that the prediction probability is not above the prediction threshold (i.e., 'no'), the method 300 comprises determining, at block 346, the distance between the target object in the consecutive frames (e.g., the distance between the center of the target objects in terms of pixels between the consecutive frames, or another distance measure).

In response to determining, at block 348, that the distance between the target object in the consecutive frames is below a distance (or pixel) threshold (i.e., 'yes'), the method 300 comprises providing, at block 350, an indication that the target object exists in the latest frame. In some embodiments, providing the indication comprises saving information relating to the detected target object for use in the prediction result for the second frame (e.g., labeled 'this r').

In response to determining that the distance between the target object in the consecutive frames is not below the distance threshold (i.e., 'no'), the method 300 comprises providing, at block 352, an indication that the target object does not exist in the latest frame. For example, the indication may discard the target object so that it is not used or ignored in the prediction result for the second frame.

In some embodiments, in response to determining, at block 354, that the target object exists in the latest (i.e., second) of the consecutive frames budo t not in the earliest (i.e., first) of the consecutive frames, the method 300 comprises comparing, at block 356, a prediction probability of the target object in the latest frame with a prediction threshold (e.g., similar to block 342).

In response to determining that the prediction probability is above the prediction threshold, the method 300 comprises providing, at block 358, an indication that the target object exists in the latest frame (i.e., 'yes', similar to block 344).

In response to determining that the prediction probability is not above the prediction threshold (i.e., 'no'), the method 300 comprises providing, at block 360, an indication that the target object does not exist in the latest frame (e.g., similar to block 352).

In some embodiments, in response to determining, at block 362, that the target object exists in the earliest (first) of the consecutive frames but not in the latest (second) of the consecutive frames, the method 300 comprises determining, at block 364, whether the target object is located at a boundary (e.g., the object may at least partially cross the boundary) in the latest frame. For example, the target object may be at least partially occluded due to leaving the region (e.g., due to being removed by an operative) or it may be occluded due to being positioned under the patient.

In response to determining that at least part of the target object is located at the boundary (i.e., 'yes'), the method 300 comprises providing, at block 366, an indication that the target object does not exist in the latest frame (e.g., similar to block 352).

In response to determining that the target object is not located at the boundary, the method 300 comprises providing, at block 368, an indication that the target object exists in the latest frame (e.g., similar to block 344).

As a result of implementing block 338, a further prediction result is obtained, at block 370, for the second frame (i.e., 'this_r'). Thus, the prediction results obtained at blocks 322 and 370 correspond to the identification of the type and tracking of the target objects between the first and second (consecutive) frames, respectively.

At block 372, the method 300 outputs the prediction result of the second frame, which can be used as described below.

At block 374, the method 300 updates the memory so that prediction result for the second frame replaces the prediction result for the first frame (i.e., since the prediction result for the first frame may no longer be valid).

At block 376, the method empties the memory holding the prediction result for the second frame (i.e., in anticipation that the next frame may be obtained by the camera 208).

At block 378, the method 300 determines whether or not the next frame exists (i.e., whether or not the camera 208 continues to obtain imaging data). If 'yes', the method 300 returns to block 324 to repeat the subsequent blocks of the method 300. If 'no', the method 300 ends at block 380.

Thus, in some embodiments, the method 300 comprises determining the type of each target object in the region and tracking each target object in consecutive frames of the imaging data.

In some embodiments, in response to outputting the prediction result at block 372, the method 300 comprises causing, at block 382, a display (e.g., display 212) to indicate a detected type and/or position of each target object with respect to a representation (e.g., displayed image) of the radiographic imaging apparatus couch 204.

At block 384 of the method 300, the type and/or position of each target object in the region is compared with an expected object configuration for the region. The expected object configuration may correspond to the specified number, type and position of at least one couch accessory associated with use of the radiographic imaging apparatus couch by the subject. In some embodiments, in response to determining that at least one target object in the region does not correspond to the expected object configuration and/or that at least one target object is missing in the region, the method 300 comprises causing, at block 386, the display to indicate that the: couch accessory is incorrectly positioned if the determine position of the at least one target object does not correspond to the indicated specified position for the couch accessory and/or at least one target object does not correspond to the expected object configuration and/or that at least one target object is missing in the region.

In some embodiments, the expected object configuration comprises a specified number, type and/or position of each target object associated with a subject (e.g., patient) using the couch. In other similar words, an operative may input, to the computing device 210, the expected object configuration for the patient. If the computing device 210 (implementing the method 300) detects that a target object (e.g., couch accessory) is missing or incorrectly placed, the block 386 causes the display to indicate this accordingly, for example, via a warning message.

Figure 4:
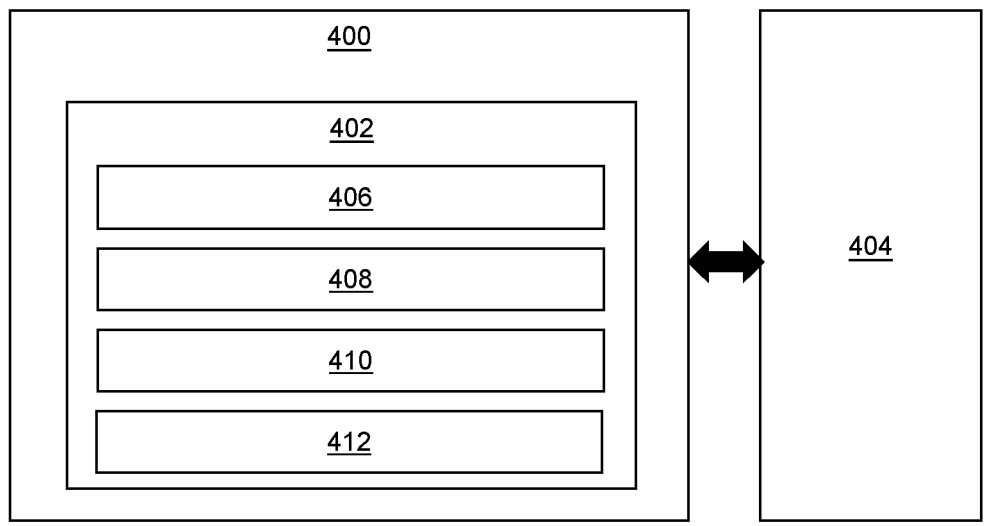
FIG. 4 is a schematic drawing of a machine-readable medium for improving the outcome of patient imaging according to an embodiment.

FIG. 4 schematically depicts a tangible machine-readable medium 400 storing instructions 402 which, when executed by at least one processor 404, cause the at least one processor 404 to implement certain methods described herein, for example, methods 100 or 300. In this embodiment, the instructions 402 comprise instructions 406 to implement the functionality of block 102 of the method 100. The instructions 402 further comprise instructions 408 to implement the functionality of block 104 of the method 100. The instructions 402 further comprise instructions 410 to implement the functionality of block 106 of the method 100. The instructions 402 further comprise instructions 412 to implement the functionality of block 108 of the method 100. The instructions 402 may comprise further instructions to implement the functionality of any of the blocks of method 300.

Figure 5:
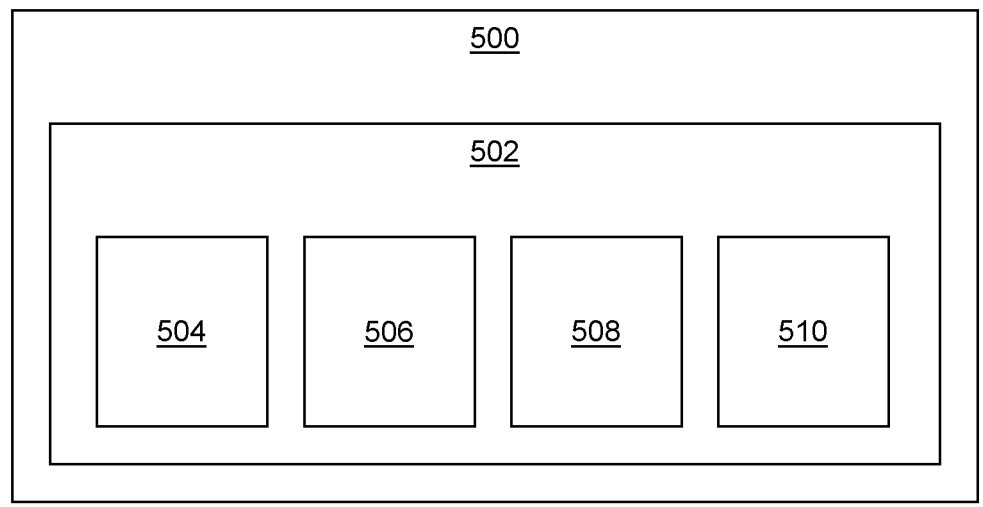
FIG. 5 is a schematic drawing of an apparatus for improving the outcome of patient imaging according to an embodiment.

FIG. 5 shows an apparatus 500, which may be used for implementing certain methods described herein such as methods 100 or 300. The apparatus 500 may comprise modules with functionality corresponding to certain features described in relation to the system 200 of FIG. 2 such as the computing device 210 thereof. In this embodiment, the apparatus 500 comprises a receiving module 504 configured to implement the functionality of block 102 of the method 100. The apparatus 500 further comprises a determining module 506 configured to implement the functionality of block 104 of the method 100. The apparatus 500 further comprises a comparing module 508 configured to implement the functionality of block 106 of the method 100. The apparatus 500 further comprises an indicating module 510 configured to implement the functionality of block 108 of the method 100. The receiving module 504, the determining module 506, the comparing module 508 and/or the indicating module 510 (or any additional module) may also be used to implement the functionality of any of the blocks of the method 300.

In some cases, any of the modules described above (e.g., the receiving module 504, the determining module 506, the comparing module 508 and/or the indicating module 510) may comprise at least one dedicated processor (e.g., an application specific integrated circuit (ASIC) and/or field programmable gate array (FPGA), etc) for implementing the functionality of the module. For example, the at least one dedicated processor may be programmed to implement the functionality described above or be configured to access a memory storing instructions and execute such instructions in order to implement the functionality described above.

While the invention has been illustrated and described in detail in the drawings and foregoing description, such illustration and description are to be considered illustrative or exemplary and not restrictive; the invention is not limited to the disclosed embodiments.

One or more features described in one embodiment may be combined with or replace features described in another embodiment. For example, the methods 100, 300 of FIG. 1 or 3a-3b may be modified based on features described in relation to the system 200 (with reference to FIG. 2), machine-readable medium 400 and/or the apparatus 500, and vice versa.

This disclosure includes the subject-matter defined by the following numbered paragraphs.

1. A computer-implemented method, comprising:
receiving imaging data of a region comprising a radiographic imaging apparatus couch; and
determining a type and position of at least one target object in the region using an instance segmentation model for processing the imaging data, wherein determining the type of the at least one target object comprises determining whether or not the at least one target object is a predetermined type of accessory associated with the radiographic imaging apparatus couch.

2. The method of paragraph 1, wherein determining in includes determining that there is a plurality of target objects in the region, in response to which the method comprises determining the predetermined type of each of the target objects from said plurality, and in response to determining that there is a plurality of target objects of the same predetermined type, the method further comprises selecting one target object from the plurality of target objects of the same predetermined type that has the highest prediction probability according to the instance segmentation model.

3. The method of paragraph 1 or 2, further comprising determining a distance between adjacent target objects of different types, and in response to determining that the distance is below a threshold, the method further comprises selecting one target object from the adjacent target objects that has the highest prediction probability of the different types according to the instance segmentation model.

4. The method of any preceding paragraph further comprising comparing consecutive frames from the imaging data to determine whether the position of the target object has changed in the region between the consecutive frames and/or whether the number and/or type of target object has changed in the region between the consecutive frames.

5. The method of paragraph 4, wherein in response to determining that the target object exists in both of the consecutive frames, the method comprises:
comparing a prediction probability of the target object in the latest of the consecutive frames with a prediction threshold, and
in response to determining that the prediction probability is above the prediction threshold, the method comprises providing an indication that the target object exists in the latest frame, or
in response to determining that the prediction probability is not above the prediction threshold, the method comprises determining the distance between the target object in the consecutive frames, and
in response to determining that the distance between the target object in the consecutive frames is below a distance threshold, the method comprises providing an indication that the target object exists in the latest frame, or
in response to determining that the distance between the target object in the consecutive frames is not below the distance threshold, the method comprises providing an indication that the target object does not exist in the latest frame.

6. The method of paragraph 4, wherein in response to determining that the target object exists in the latest of the consecutive frames but not in the earliest of the consecutive frames, the method comprises:
comparing a prediction probability of the target object in the latest frame with a prediction threshold, and
in response to determining that the prediction probability is above the prediction threshold, the method comprises providing an indication that the target object exists in the latest frame, or
in response to determining that the prediction probability is not above the prediction threshold, the method comprises providing an indication that the target object does not exist in the latest frame.

7. The method of paragraph 4, in response to determining that the target object exists in the earliest of the consecutive frames but not in the latest of the consecutive frames, the method comprises:
determining whether the target object is located at a boundary in the latest frame, and in response to determining that at least part of the target object is located at the boundary, the method comprises providing an indication that the target object does not exist in the latest frame, or
in response to determining that the target object is not located at the boundary, the method comprises providing an indication that the target object exists in the latest frame.

8. The method of any preceding paragraph, comprising determining the type of each target object in the region and tracking each target object in consecutive frames of the imaging data.

9. The method of any preceding paragraph the method further comprising causing a display to indicate a detected type and/or position of each target object with respect to a representation of the radiographic imaging apparatus couch.

10. The method of paragraph 9, comprising comparing the type and/or position of each target object in the region with an expected object configuration for the region and, in response to determining that at least one target object in the region does not correspond to the expected object configuration and/or that at least one target object is missing in the region, the method comprises causing the display to indicate that the at least one target object does not correspond to the expected object configuration and/or that at least one target object is missing in the region.

11. The method of paragraph 10, wherein the expected object configuration comprises a specified number, type and/or position of each target object associated with a subject using the couch.

12. The method of any preceding paragraph, wherein the instance segmentation model is implemented by a Mask Region-based Convolutional Neural Network, R-CNN, trained using a dataset prepared using a plurality of images of different radiographic imaging apparatus couch settings annotated according to at least one predefined annotation principle.

13. A tangible machine-readable medium comprising instructions which, when executed on at least one processor, cause the at least one processor to implement the method of any preceding paragraph.

14. Apparatus comprising processing circuitry, the processing circuitry comprising:
a receiving module configured to receive imaging data of a region comprising a radiographic imaging apparatus couch; and
a determining module configured to determine a type and position of at least one target object in the region using an instance segmentation model for processing the imaging data, wherein determining the type of the at least one target object comprises determining whether or not the at least one target object is a predetermined type of accessory associated with the radiographic imaging apparatus couch.

15. The method paragraphs of 1 to 13 or the apparatus of paragraph 14, wherein imaging data comprise depth information of the region.

Embodiments in the present disclosure can be provided as methods, systems or as a combination of machine-readable instructions and processing circuitry. Such machine-readable instructions may be included on a non-transitory machine (for example, computer) readable storage medium (including but not limited to disc storage, CD-ROM, optical storage, etc.) having computer readable program codes therein or thereon.

The present disclosure is described with reference to flow charts and block diagrams of the method, devices and systems according to embodiments of the present disclosure. Although the flow charts described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine readable instructions.

The machine-readable instructions may, for example, be executed by a general-purpose computer, a special purpose computer, an embedded processor or processors of other programmable data processing devices to realize the functions described in the description and diagrams. In particular, a processor or processing circuitry, or a module thereof, may execute the machine-readable instructions. Thus functional modules of the system 200 and/or apparatus 500 (for example, computing device 210, receiving module 504 and/or determining module 506) and other devices described herein may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by block(s) in the flow charts and/or in the block diagrams.

Further, the teachings herein may be implemented in the form of a computer program product, the computer program product being stored in a storage medium and comprising a plurality of instructions for making a computer device implement the methods recited in the embodiments of the present disclosure.

Elements or steps described in relation to one embodiment may be combined with or replaced by elements or steps described in relation to another embodiment. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented method for assisting in positioning at least one couch accessory associated with a radiographic imaging apparatus couch, comprising:
   receiving imaging data of a region comprising the radiographic imaging apparatus couch;
   receiving, manually via a user input, a predetermined type and position of the at least one couch accessory;
   using an instance segmentation model for processing the imaging data to determine a type and position of at least one target object in the region;
   based on a result from the instance segmentation model, determining whether the type of the target object matches the predetermined type of the couch accessory, and if so, then comparing the determined position of the target object with the predetermined position off the couch accessory; and
   in response that the determined position of the target object does not correspond to the predetermined position off the couch accessory, indicating that the target object is incorrectly positioned.

2. The method of claim 1, wherein the predetermined position of the at least one couch accessory is based on a need for the at least one couch accessory to be positioned appropriately to support the subject.

3. The method of claim 1, further comprising determining that there is a plurality of target objects in the region, in response to which the method further comprises determining the type of couch accessory corresponding to each of the target objects from the plurality, and in response to determining that there is a plurality of target objects of the same type, the method further comprises selecting one target object from the plurality of target objects of the same type that has the highest prediction probability according to the instance segmentation model.

4. The method of claim 1, further comprising determining a distance between adjacent target objects of different types, and in response to determining that the distance is below a threshold, the method further comprises selecting one target object from the adjacent target objects that has the highest prediction probability of the different types according to the instance segmentation model.

5. The method of claim 1 further comprising comparing consecutive frames from the imaging data to determine whether the position of the target object has changed in the region between the consecutive frames and/or whether the number and/or type of the target object has changed in the region between the consecutive frames.

6. The method of claim 5, wherein in response to determining that the target object exists in both of the consecutive frames, the method comprises:

comparing a prediction probability of the target object in the latest of the consecutive frames with a prediction threshold, and in response to determining that the prediction probability is above the prediction threshold, the method comprises providing an indication that the target object exists in the latest frame, or in response to determining that the prediction probability is not above the prediction threshold, the method comprises determining the distance between the target object in the consecutive frames, and in response to determining that the distance between the target object in the consecutive frames is below a distance threshold, the method comprises providing an indication that the target object exists in the latest frame, or in response to determining that the distance between the target object in the consecutive frames is not below the distance threshold, the method comprises providing an indication that the target object does not exist in the latest frame.

7. The method of claim 5, wherein in response to determining that the target object exists in the latest of the consecutive frames but not in the earliest of the consecutive frames, the method comprises:

comparing a prediction probability of the target object in the latest frame with a prediction threshold, and in response to determining that the prediction probability is above the prediction threshold, the method comprises providing an indication that the target object exists in the latest frame, or in response to determining that the prediction probability is not above the prediction threshold, the method comprises providing an indication that the target object does not exist in the latest frame.

8. The method of claim 5, wherein in response to determining that the target object exists in the earliest of the consecutive frames but not in the latest of the consecutive frames, the method comprises:

determining whether the target object is located at a boundary in the latest frame, and in response to determining that at least part of the target object is located at the boundary, the method comprises providing an indication that the target object does not exist in the latest frame, or in response to determining that the target object is not located at the boundary, the method comprises providing an indication that the target object exists in the latest frame.

9. The method of claim 1, further comprising determining the type of each target object in the region and tracking each target object in consecutive frames of the imaging data.

10. The method of claim 1, further comprising causing a display to indicate a detected type and/or position of each target object with respect to a representation of the radiographic imaging apparatus couch.

11. The method of claim 10, further comprising causing the display to indicate that the couch accessory is incorrectly positioned if the determined position of the at least one target object does not correspond to the predetermined position for the couch accessory.

12. The method of claim 1, wherein the instance segmentation model is implemented by a Mask Region-based Convolutional Neural Network (R-CNN) trained using a dataset prepared using a plurality of images of different radiographic imaging apparatus couch settings annotated according to at least one predefined annotation principle.

13. A non-transitory computer-readable medium comprising instructions which, when executed by at least one processor, cause the at least one processor to perform a method for assisting in positioning at least one couch accessory associated with a radiographic imaging apparatus couch, the method comprising:

receiving imaging data of a region comprising the radiographic imaging apparatus couch;

receiving, manually via a user input, a predetermined type and position of the at least one couch accessory;

using an instance segmentation model for processing the imaging data to determine a type and position of at least one target object in the region;

based on a result from the instance segmentation model, determining whether the type of the target object matches the predetermined type of the couch accessory, and if so, then comparing the determined position of the target object with the predetermined position off the couch accessory; and in response that the determined position of the target object does not correspond to the predetermined position off the couch accessory, indicating that the target object is incorrectly positioned.

14. A medical apparatus for assisting in positioning at least one couch accessory associated with a radiographic imaging apparatus couch, comprising:

a memory that stores a plurality of instructions; and a processor that couples to the memory and is configured to execute the plurality of instructions to:

receive imaging data of a region comprising the radiographic imaging apparatus couch;

receive, manually via a user input, a predetermined type and position of the at least one couch accessory;

use an instance segmentation model for processing the imaging data to determine a type and position of at least one target object in the region;

based on a result from the instance segmentation model, determine whether the type of the target object matches the predetermined type of the couch accessory, and if so, then compare the determined position of the target object with the predetermined position off the couch accessory; and in response that the determined position of the target object does not correspond to the predetermined position off the couch accessory, indicate that the target object is incorrectly positioned.

* * * * *